Patented Dec. 2, 1947

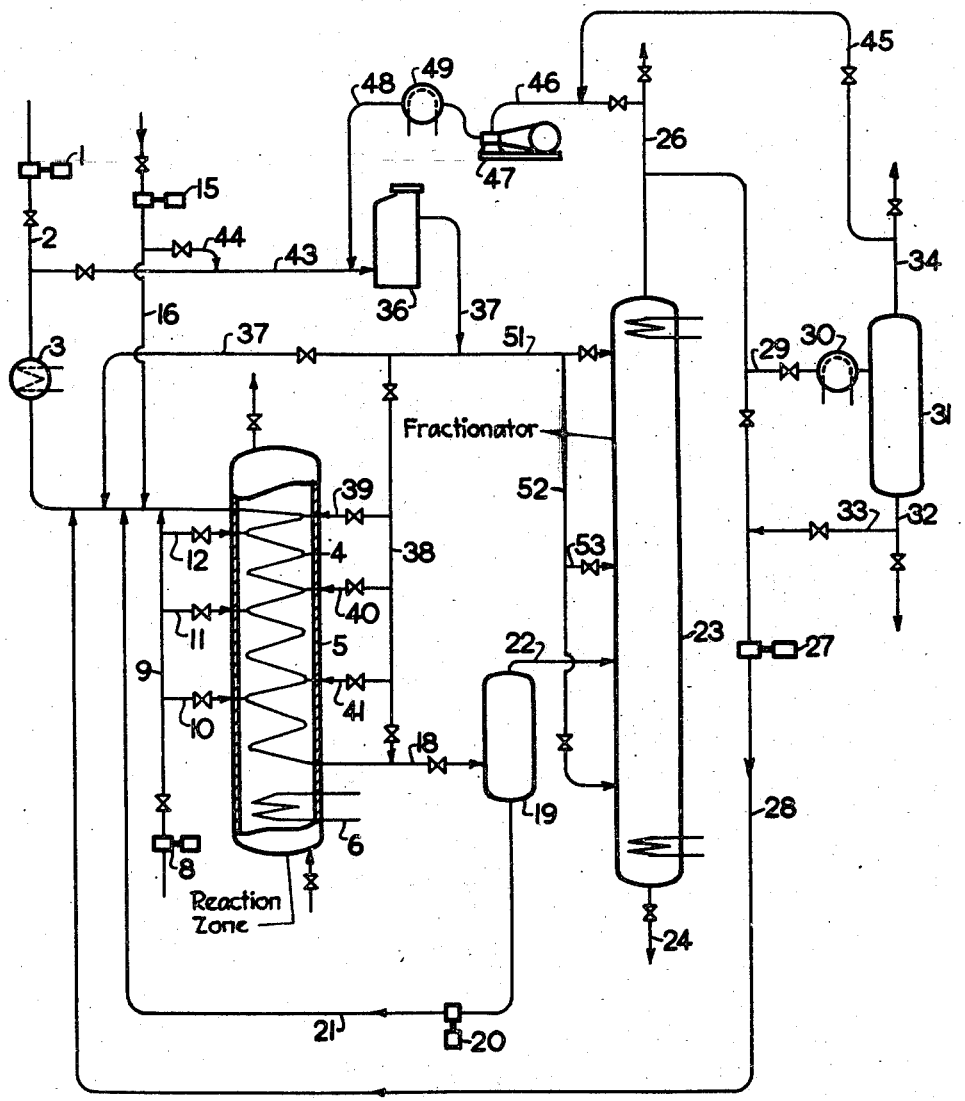

2,431,715

UNITED STATES PATENT OFFICE 2,431,715

PREVENTION OF CORROSION IN HYDROGEN FLUORIDE CATALYTIC ORGANIC REACTIONS

Aaron Wachter, Berkeley, Calif., assignor to Shell Development Company, San Francisco, Calif., a corporation of Delaware Application January 14, 1944, Serial No. 518,273

9 Claims. (Cl. 260—683.4)

This invention relates to the execution of organic chemical reactions with the aid of hydrogen fluoride and relates more particularly to improvements in the execution of catalytic hydrocarbon reactions in the presence of catalysts comprising hydrofluoric acid.

Hydrogen fluoride finds application as a reagent and/or catalyst in an ever-increasing number of organic chemical processes. In the field of hydrocarbon chemistry it is used as a catalyst in a wide variety of catalytic hydrocarbon conversions important in the synthesis of specific individual hydrocarbons as well as in the production of valuable hydrocarbon motor fuels, lubricants, solvents, etc. Specific hydrocarbon conversion processes wherein hydrogen fluoride finds application as a catalyst comprise alkylation, polymerization, condensation, dehydrogenation, isomerization, etc.

Conditions under which the hydrogen fluoride is used will vary considerably with the nature of the particular conversion process and the particular material treated therein. Thus, hydrogen fluoride is used as a catalyst both in the liquid phase as well as in the gaseous phase, and at temperatures ranging, for example, from about $-40°$ C. to as high as about $350°$ C. Though often used per se, hydrogen fluoride may be employed in the presence of certain added materials such as, for example, boron halides, functioning as a promoter, complement, or modifier of its catalytic effect.

Though hydrogen fluoride in the completely anhydrous form is often referred to as having but little corrosive action upon many metal surfaces, its effect under practical operating conditions, particularly on the more readily available and less costly materials of construction such as the ferrous metal-containing materials, is generally sufficiently pronounced to influence decidedly the efficiency of the process. Such detrimental effect is not limited to considerable shortening of the life of costly equipment but includes the loss of catalyst and the promotion, to an undue degree, of undesirable side reactions by the iron fluoride formed as a result of the corrosive action of the catalyst upon any ferrous metal-containing surface in contact therewith. In practical operation the hydrogen fluoride is, however, often used in aqueous form, the water content of the acid varying from a trace to as much as 20% and more. Even in processes wherein the use of the catalyst in the anhydrous form is theoretically preferred, the presence of small amounts of water will generally be encountered, due either to practical impossibility or economic infeasibility of preventing the formation in, or the entry into the system of any traces of water in large scale operation. The presence of water in varying amounts, generally encountered in large scale operation, considerably increases the importance of the problem of corrosion often acting as a serious deterrent to practical operation of a process. It is to be noted that the problem of corrosion in the presence of hydrogen fluoride as used in processes heretofore, is rendered particularly acute by the fact that the corrosion, once initiated, proceeds at a progressively increasing rate, apparently being of an autocatalytic nature.

It is an object of the present invention to provide an improved process enabling the more efficient execution of organic reactions with the aid of catalysts comprising hydrogen fluoride wherein the substantial corrosion of metal-containing surfaces in contact with said catalyst, inherent in processes used heretofore, is reduced to at least a substantial degree.

Another object of the present invention is the provision of an improved process for the more efficient execution of catalytic hydrocarbon conversions with the aid of catalysts comprising hydrogen fluoride wherein the substantial corrosion of metal-containing surfaces in contact with said catalyst inherent in processes used heretofore is reduced to at least a substantial degree.

Another object of the invention is the provision of an improved process for the more efficient alkylation of hydrocarbons with the aid of catalysts comprising hydrogen fluoride.

A still further object of the invention is the provision of a hydrogen fluoride-containing catalyst of substantially reduced corrosive effect upon metal surfaces in contact therewith.

In accordance with the present invention serious difficulties heretofore encountered in the execution of organic reactions with the aid of catalysts comprising hydrogen fluoride are obviated to at least a substantial degree, and improved efficiency is attained by maintaining in the catalyst a metal of groups IV and V of the periodic table. By the term "metals" as used throughout the specification and appended claims it is intended to include the elements, arsenic and antimony.

The metals of groups IV and V are not necessarily equivalent in the degree to which the advantage of their addition to the catalyst is obtained. Some of the metals are more effective in their corrosion-inhibiting properties than others; their comparative effect in this regard being to some extent determined by the severity of operating conditions and the composition of the metal surface in contact with the catalyst. Similarly, the amount of a specific inhibitor metal to be maintained within the catalyst will vary in accordance with variations in operating conditions and composition of the metal surface in contact therewith. In general, when the metal surface not in contact with the reactants comprises a ferrous metal surface, the concentration of the inhibitor metal to be maintained in the reaction zone will be from about 0.01% to about 20%, and preferably from about 0.1% to about 10% by weight of the catalyst.

Of the metals of groups IV and V antimony, arsenic and bismuth are preferred. The inhibitor metal need not necessarily be introduced into the catalyst or into the system in the uncombined or metallic form but may be employed in the form of a suitable compound thereof. Suitable compounds of the inhibitor metals comprise the metal in chemical combination with one or more of the halides such as the chlorides, bromides and fluorides, for example, $SbCl_3$, $SbF_3$, $SbBr_3$, $SbCl_4$, $SbCl_5$, $SbF_5$, $SbBr_5$, $BiCl_2$, $BiBr_2$, $BiCl_3$, $BiF_3$, $BiBr_3$, $BiCl_4$, $BiF_4$, $SnCl_2$; halide salts of the inhibitor metals comprising more than one type of halide atom, for example, $SbBrF_4$, antimony fluorochlorides; salts of the inhibitor metals and oxygen-containing acids, for example, $Na_3AsO_4$, $Sb_2(SO_4)_3$, $BiSO_4$; and salts of inhibitor metals and organic acids.

Although it is generally sufficient to effect the addition to the catalyst, or the introduction into the system, of but one of the inhibitor metals, more than one of these metals or compounds thereof may be added to obtain suppression of corrosion to a desired degree. The inhibitor metal, or compound comprising it, may also be employed in the form of an admixture or even a chemical combination with organic compounds. Thus, inhibitor metal-containing sludge recovered from a catalytic conversion in the presence of hydrogen fluoride wherein the metal was used as a corrosion inhibitor may be recycled to the inlet of the reaction zone; or the inhibitor metal-containing sludge obtained from an entirely separate refinery operation wherein the metal was used as catalyst treating agent or the like may suitably comprise the inhibitor metal-containing compound utilized in accordance with the present invention. For example, an antimony trichloride-containing sludge obtained in the isomerization or alkylation of hydrocarbons, or in similar operations with the aid of metal halide-containing catalysts, may be utilized as a suitable antimony-containing inhibitor compound in accordance with the present invention.

The inhibitor metal in uncombined or combined form may be introduced directly into the hydrogen fluoride catalyst or may be introduced into the reaction zone in any suitable manner. It may be introduced in the form of solid pieces; a powder; as a slurry or a suspension in a suitable liquid medium such as, for example, as a suspension in a hydrocarbon, a hydrocarbon fraction or a part of the hydrogen fluoride catalyst; as a solution in a solvent, for example, a hydrocarbon, an acid compatible with the catalyst used or the hydrogen fluoride itself, etc. The inhibitor may be introduced into the hydrogen fluoride before contact therewith of the material to be treated, or it may be introduced in part or in its entirety into the hydrocarbon charge, or directly into the reaction zone during the course of operation.

The presence of the inhibitor metal in the conversion zone, preferably within the prescribed concentrations, is maintained throughout the operation. Subjection of the metal surface to contact with the inhibitor metal prior to, or in intermittent stages of, operation will generally not render such surfaces immune to subsequent severe corrosion by the hydrogen fluoride in the absence of the inhibitor metal. Since the catalyst and hydrocarbons are generally passed in continuous stream through the system, the continuous presence of the metal inhibitor within the system throughout the operation will generally require the substantially continuous addition of the inhibitor.

Though the ability of the added compound to dissolve in the hydrocarbon or in the hydrogen fluoride catalyst is not essential to the attainment of the desired results, those capable of solution to some degree in either the hydrocarbon or in the hydrogen fluoride, or in both, are nevertheless somewhat preferred. Compounds of inhibitor metals advantageous in this respect comprise, for example, $AsCl_3$, $SbCl_3$, $BiCl_3$, $AsF_3$, and $SbF_3$. Preference of a particular compound of a suitable inhibitor metal may be governed by the physical state of the compound under operating conditions. Thus, in a process utilizing the hydrogen fluoride in the liquid phase it may at times be desirable to use a compound which is liquid at relatively low temperatures, such as, for example, $SbF_5$, $AsF_3$, $BiF_3 \cdot 3HF$. On the other hand, when utilizing hydrogen fluoride in the gaseous phase at relatively low temperatures, the use of a compound of a metal in gaseous form at relatively low temperatures, for example, $AsF_5$, is at times desired. In processes utilizing hydrogen fluoride in the gaseous phase at elevated temperatures such as, for example, in the catalytic polymerization of hydrocarbons in the presence of a catalyst comprising hydrogen fluoride, the use of the inhibitor metal in the form of a compound capable of vaporizing or subliming at, and preferably below, the conditions of operations are generally preferred. The compound of the inhibitor metal may be introduced into the hydrocarbon charge and vaporized therewith before introduction into the reaction zone in the vapor phase-type of operations, or it may be caused to vaporize in the reaction zone, or it may be vaporized and separately introduced into the reaction zone. Another advantageous method for the introduction of the inhibitor into the reaction zone in vapor phase-type of operation comprises introducing into the upper part of the reaction zone a suspension or solution of the inhibitor metal, or compound thereof, in a liquid medium, for example, a hydrocarbon which may or may not vaporize at the conditions of operation.

In order to set forth more fully the nature of the invention, without, however, intending to limit the scope of organic reactions executed with the aid of hydrogen fluoride-containing catalysts to which it may be applied, it will be described in detail in its application to the liquid phase alkylation of hydrocarbons with reference to the attached drawing wherein the single figure shows a more or less diagrammatical elevational view of one form of apparatus suitable for the execution of the invention.

Hydrocarbons comprising an alkylatable hydrocarbon, for example, an iso paraffin, such as isobutane, is forced by means of pump 1 through valved line 2 into a conversion zone. Means for the introduction or withdrawal of heat from the hydrocarbons flowing through line 2 comprising, for example, an indirect heat exchanger 3, are provided. The reaction zone may comprise any suitable type of reactor, chamber or zone of restricted cross-sectional area enabling efficient contact of catalyst and reactants at the desired reaction conditions. The reaction zone may comprise an elongated coil 4 positioned in a suitable housing enabling the maintenance of the desired temperature within the coil. The housing may comprise a furnace structure or the like enabling the external contact of the coil with gaseous or liquid heating or cooling media. The housing may comprise an enlarged chamber 5 provided with suitable means for the maintenance therein of gaseous or liquid cooling or heating media at the desired temperature. Heating or cooling means such as, for example, a closed coil 6 may be positioned within chamber 5. Additional means not shown in the drawing are provided for the maintenance of the liquid media at the desired temperature.

An alkylating agent, for example, an olefinic hydrocarbon such as a butene, or a mixture of olefinic hydrocarbons such as a mixture of butenes, is forced by means of pump 8, through valved line 9, into line 2. Since it is desired to maintain a relatively low concentration of the alkylating agent with respect to the paraffin throughout the conversion zone, it is generally preferred to introduce the olefin into the reaction zone at a plurality of points along the length thereof. Valved lines 10, 11 and 12 are therefore provided to enable the injection of butene into coil 4 at a plurality of points along the length thereof.

Hydrogen fluoride drawn from an outside source is forced by means of pump 15 through valved line 16 into line 2. Within coil 4 the reactants are maintained under alkylation conditions conducive to the interaction of the paraffin and olefin with the formation of a branched-chain saturated hydrocarbon, the number of carbon atoms of which is equal to the summation of the carbon atoms contained in both atoms of the interacting paraffin and olefin. In the present illustrative description the isobutane and butene will interact with the formation of an alkylate consisting predominantly of iso-octanes. The conditions of temperature and pressure to be maintained within coil 4 will vary with the particular hydrocarbons charged. In general, a temperature of from about $-20°$ C. to about $200°$ C. and a pressure of from about 25 lbs. to about 2,000 lbs. and higher may be used. In the alkylation of isobutane with butene a temperature in the range of, for example, from about $-20°$ C. to about $100°$ C. and preferably from about $0°$ C. to about $40°$ C. are suitable. A pressure sufficiently high is maintained within coil 4 to keep at least a substantial part of the reactants in the liquid phase. The hydrogen fluoride introduced into the system may be in substantially anhydrous form or may contain water in amounts ranging from a trace up to about 20% and higher. The proportion of hydrogen fluoride catalyst introduced into the reaction zone may vary between, for example, about 2% to about 75%, and generally between about 15% and about 40%, by volume of the hydrocarbon charge.

Reaction products comprising alkylate, unreacted hydrocarbons and catalyst are passed from coil 4, through transfer line 18, into a liquid phase separator 19. Within separator 19 a supernatant liquid layer comprising alkylate and unreacted hydrocarbons is separated from a lower liquid layer comprising the hydrogen fluoride. The lower layer is recycled by means of pump 20, through line 21, into line 2. The upper layer is passed from separator 19, through line 22, into a fractionator 23. Within fractionator 23 a vapor fraction comprising unreacted hydrocarbons is separated from a liquid fraction comprising iso-octane-containing alkylate. The liquid fraction is withdrawn from reactor 23 through valved line 24 as a final product.

The vapor fraction is removed from fractionator 23 through valved line 26. A part or all of the vapor fraction is recycled by means of pump 27 through valved line 28 to line 2. If desired, a part or all of the stream flowing through line 28 may pass through valved line 29 and condenser 30 into an accumulator 31. In passing through condenser 30 the stream is cooled to a temperature sufficiently low to condense $C_4$ hydrocarbons. From accumulator 31 liquid is withdrawn through valved line 32 and may be passed in part or in its entirety through line 33 into line 28. Uncondensed vapors and gaseous materials are eliminated from separator 31 through valved line 34.

A corrosion inhibitor metal, or a compound thereof, comprised within the group defined above, is continuously introduced into line 2 and preferably into coil 4 at intermediate points along the length thereof. Although any suitable method of introduction may be resorted to, in a preferred method of executing the process of the invention, a part of the hydrocarbon feed or hydrogen fluoride catalyst is passed through a suitable container, for example, a drum 36 containing the inhibitor metal or compound comprising it. From drum 36 the stream containing the inhibitor in solution and/or in suspension is passed through valved line 37 into line 2, and through valved line 38 and branched lines 39, 40 and 41 into coil 4 at intermediate points along the length thereof, as well as into transfer line 18.

Sufficient hydrocarbon charge is by-passed through valved line 43 into drum 36 to provide the desired concentration of the inhibitor metal in the reaction zone. When an inhibitor which is soluble to at least some degree in hydrocarbons such as, for example, $SbCl_3$, $BiCl_3$, $AsCl_3$, etc., or metals of groups IV and V soluble in hydrocarbons are used, the passage of a portion of hydrocarbon from line 2 through line 43 into drum 36 is generally sufficient. When utilizing a metal of groups IV or V or a compound thereof which is soluble in hydrogen fluoride or which reacts with hydrogen fluoride to produce a compound soluble in hydrogen fluoride, hydrogen fluoride may be by-passed from line 16 through valved line 44 into line 43 and may comprise the only liquid passed through drum 36. Often it will be preferable to introduce into the system as inhibitor compounds of groups IV or V such as certain fluorides which are either not readily available or are difficult to handle. Introduction into the reaction zone of compounds leading to the formation of these materials within the reaction zone is often not practical for reasons which comprise mechanical difficulty of introducing the compound into the reactor and the violence of the resulting reaction under conditions prevailing in the reaction zone. In accordance with the present invention these difficulties are obviated by maintaining in drum 36 a more readily available compound of the metal, the fluorine-containing compound of which is desired such as, for example, AsCl₃, Sb₂O₃, etc. and passing therethrough sufficient hydrocarbon emanating from line 2 through line 43, and containing only sufficient hydrogen fluoride emanating from line 44 to provide an effluent hydrocarbon stream from drum 36 through line 37 containing a sufficient amount of the fluorine-containing compound of the inhibitor metal as for example, AsF₃, SbF₃, etc., to maintain the desired concentration of the inhibitor metal in the reaction zone. When operating in this wise, the ratio of hydrogen fluoride to hydrocarbon in the stream entering drum 36 will generally be substantially below that of the ratio of hydrogen fluoride to hydrocarbon in coil 4. In this wise by the passage of a hydrocarbon stream containing but a low content of hydrogen fluoride through drum 36, desirable fluorine-containing compounds of the inhibitor metals may be efficiently and safely produced within the system in the amount required.

In a modification of the invention the vapors eliminated from the upper part of fractionator 23 through line 26, and optionally the gaseous fraction eliminated from accumulator 31 through line 34, which generally will contain relatively small proportions of hydrogen fluoride in admixture with greater proportions of unconverted hydrocarbons, may be recycled in part or in their entirety through drum 36 to provide a part or all of the medium required to bring the inhibitor from drum 36 to coil 4. To this purpose valved lines 45 and 46 are provided leading from lines 34 and 26, respectively, to the low pressure side of a compressor 47. From the high pressure side of compressor 47 the compressed stream passes through valved line 48 containing suitable cooling means such as, for example, a cooler 49, into line 43.

Under the above described conditions of operation substantial improvement in efficiency of operation with at least a substantial degree of reduction of corrosion difficulties heretofore encountered, and a considerable increase in yield of alkylate per pound of catalyst used will be obtained.

Although some of the metal inhibitor is often introduced with the hydrocarbon stream into fractionator 23, particularly when a metal or compound soluble in the hydrocarbon reactants is used, corrosion difficulties will, nevertheless, often be encountered unless additional amounts of the inhibitor metal be introduced into fractionator 23. In accordance with the invention a part of the effluent from drum 36 comprising the inhibitor metal or compound thereof, dissolved or suspended in a suitable liquid medium, is passed from line 37 through valved line 51 into the upper part of fractionator 23. When the metal inhibitor or compound thereof or the liquid media comprising it, is of relatively low volatility, a part or all of the stream flowing through line 51 may be passed through vaved line 52 containing branched line 53 into fractionator 23 at one or more intermediate points thereof.

Separation of any inhibitor metal, or compounds containing it, from the resulting alkylate may be effected by any suitable means comprising, for example, one or more of such steps as water-washing, washing with alkaline solutions, distillation, fractionation, scrubbing, solvent extraction, treatment with solid adsorptive materials at normal or elevated temperatures, etc. When utilizing only relatively low concentrations of the inhibitor metals, it will often be unnecessary to effect the removal of the small amounts of entrained material from the alkylate product.

Although the invention has been described in detail with respect to its application in the alkylation of a paraffin hydrocarbon with an olefin, it is to be stressed that the invention is in no wise limited in its application to this particular reaction. Thus, it may be applied broadly to the alkylation of any alkylatable organic compound containing a hydrogen atom capable of replacement by an alkyl group. Such alkylation reactions comprise the alkylation, in the presence of hydrogen fluoride-containing catalysts, of a paraffin with a paraffin; an aromatic hydrocarbon with an olefin; aromatic hydrocarbons with alcohols; cycloparaffins with cyclic paraffins and/or cyclic olefins; ethers with aromatics; and other types of alkylation reactions or treatments conducted under alkylating conditions of any hydrocarbon mixture. The invention is furthermore not to be considered as limited in its application to the execution of reactions of the alkylation type but may be applied broadly to the execution of any organic reactions conducted in the presence of catalysts comprising hydrogen fluoride. Such reactions comprise among others, for example, condensations, dehydrations, polymerizations, molecular rearrangements, isomerization, etc.

I claim as my invention:

1. In a catalytic hydrocarbon conversion process wherein an admixture of hydrocarbons and a catalyst comprising hydrogen fluoride is passed through a system of apparatus comprising a reaction zone wherein said admixture is subjected to conversion conditions, said apparatus providing metal containing surfaces in direct contact with said catalyst, said metal-containing surface being subject to corrosion by said catalyst, the method of inhibiting corrosion of said metal surfaces which comprises injecting into said system at a plurality of points thereof a metal of groups IV and V of the periodic table.

2. In a catalytic hydrocarbon conversion process wherein hydrocarbons are contacted under conversion conditions with a catalyst comprising hydrogen fluoride in a reaction zone comprising a metal-containing surface in direct contact with said catalyst, said metal-containing surface being subject to corrosion by said catalyst, the method of inhibiting corrosion of said metal surface which comprises adding to a portion of the hydrocarbon charge to said reaction zone a metal of groups IV and V of the periodic table, and introducing said portion of the hydrocarbon charge containing said metal into the reaction zone at a plurality of spaced points along the length thereof.

3. In a catalytic hydrocarbon conversion process wherein hydrocarbons and a catalyst comprising hydrogen fluoride are introduced into a conversion zone providing a metal-containing surface in direct contact with said catalyst and the resulting mixture is subjected to hydrocarbon conversion conditions in said conversion zone, said metal-containing surface being subject to corrosion by said catalyst, the improvement which comprises adding a metal of groups IV and V to a portion of said catalyst and separately introducing said portion of catalyst containing said metal into said conversion zone at a plurality of spaced points along the length thereof.

4. In a catalytic hydrocarbon conversion process wherein hydrocarbons are contacted under conversion conditions with a catalyst comprising hydrogen fluoride in a conversion zone comprising a metal-containing surface in direct contact with said catalyst, said metal-containing surface being subject to corrosion by said catalyst, the improvement which comprises diverting a portion of the hydrocarbon and catalyst charge to said conversion zone through a vessel containing a metal of groups IV and V of the periodic table and passing effluence comprising hydrocarbons at least partly saturated with respect to said metal from said vessel into said conversion zone.

5. In a catalytic hydrocarbon conversion process wherein hydrocarbons are contacted under conversion conditions with a catalyst comprising hydrogen fluoride in a conversion zone comprising a metal-containing surface in direct contact with said catalyst, said metal-containing surface being subject to corrosion by said catalyst, the improvement which comprises diverting a portion of the hydrocarbon and catalyst charge to said conversion zone through a vessel containing a metal of groups IV and V of the periodic table and passing effluence comprising hydrocarbons at least partly saturated with respect to said metal from said vessel into said conversion zone at a plurality of spaced points along the length thereof.

6. In a catalytic hydrocarbon conversion process wherein hydrocarbons are contacted under conversion conditions with a catalyst comprising hydrogen fluoride in a conversion zone comprising a metal-containing surface in direct contact with said catalyst, said metal-containing surface being subject to corrosion by said catalyst, the improvement which comprises diverting a portion of the hydrocarbon and catalyst charge to said conversion zone through a vessel containing a metal of groups IV and V of the periodic table, the ratio of catalyst to hydrocarbon entering said vessel being less than the ratio of catalyst to hydrocarbon in said conversion zone, and passing effluence comprising hydrocarbons at least partly saturated with respect to said metal from said vessel into said conversion zone.

7. In an alkylation process wherein an alkylatable organic compound is contacted with an alkylating agent in the presence of a catalyst comprising hydrogen fluoride at alkylating conditions in a conversion zone providing a metal-containing surface in direct contact with said catalyst, said metal-containing surface being subject to corrosion by said catalyst, the improvement which comprises diverting a portion of said alkylatable organic compound and catalyst charge to said conversion zone into a vessel containing a metal of groups IV and V of the periodic table, and passing effluence comprising said alkylatable organic compound saturated to at least a substantial degree with said metal from said vessel into said conversion zone.

8. In an alkylation process wherein an alkylatable paraffinic hydrocarbon is contacted with an olefin in the presence of a catalyst comprising hydrogen fluoride at alkylating conditions in a conversion zone providing a metal-containing surface in direct contact with said catalyst, said metal-containing surface being subject to corrosion by said catalyst, the improvement which comprises diverting a portion of said alkylatable paraffinic hydrocarbon and catalyst charge to said conversion zone into a vessel containing a metal of groups IV and V of the periodic table, and passing effluence comprising said alkylatable paraffinic hydrocarbon saturated to at least a substantial degree with said metal from said vessel into said conversion zone.

9. In an alkylation process wherein an alkylatable paraffinic hydrocarbon is contacted with an olefin in the presence of a catalyst comprising hydrogen fluoride at alkylating conditions in a conversion zone providing a metal-containing surface in direct contact with said catalyst, said metal-containing surface being subject to corrosion by said catalyst, the improvement which comprises diverting a portion of said alkylatable paraffinic hydrocarbon and catalyst charge to said conversion zone into a vessel containing a metal of groups IV and V of the periodic table, and passing effluence comprising said alkylatable paraffinic hydrocarbon saturated to at least a substantial degree with said metal from said vessel into said conversion zone at a plurality of spaced points along the length thereof.

AARON WACHTER.

REFERENCES CITED

The following references are of record in the file of this patent:

UNITED STATES PATENTS

| Number | Name | Date |
| --- | --- | --- |
| 2,126,284 | Rose | Aug. 9, 1938 |
| 2,338,248 | Kassel | Jan. 4, 1944 |
| 2,307,773 | Egloff | Jan. 12, 1943 |
| 2,267,730 | Grosse | Dec. 30, 1941 |
| 2,325,052 | Grosse et al. | July 27, 1943 |
| 2,360,436 | Matuszak | Oct. 17, 1944 |
| 2,317,694 | Ott | Apr. 27, 1943 |
| 2,378,762 | Frey | June 19, 1945 |
| 2,378,763 | Frey | June 19, 1945 |